United States Patent
Hashimoto et al.

[11] Patent Number: 6,023,401
[45] Date of Patent: Feb. 8, 2000

[54] ABNORMALITY DETECTING DEVICE FOR EXHAUST SECONDARY AIR SUPPLYING SYSTEM

[75] Inventors: Akira Hashimoto; Toshikazu Oketani; Yoshitaka Hibino; Masaaki Tomii; Hiroyuki Sugiura; Kentaro Yokoo, all of Wako, Japan

[73] Assignee: Honda Giken Kogyo Kabushiki Kaisha, Tokyo, Japan

[21] Appl. No.: 09/143,360

[22] Filed: Aug. 28, 1998

[30] Foreign Application Priority Data

Aug. 29, 1997 [JP] Japan ................................... 9-233547

[51] Int. Cl.[7] ..................................................... H02H 3/00
[52] U.S. Cl. ............................ 361/93.1; 361/23; 361/115
[58] Field of Search ................... 60/277, 23, 58, 60/115; 361/23, 58, 93.1, 115

[56] References Cited

U.S. PATENT DOCUMENTS 5,615,552  4/1997  Shimasaki et al. ....................... 60/277
5,735,121  4/1998  Kato et al. .................................. 60/277

FOREIGN PATENT DOCUMENTS 8-61051  3/1996  Japan ................................. F01N 3/22

*Primary Examiner*—Jeffrey Gaffin
*Assistant Examiner*—S W Jackson
*Attorney, Agent, or Firm*—Nikaido Marmelstein Murray & Oram LLP

[57] ABSTRACT

In an exhaust secondary air supply system including an electric air pump and a flow rate control valve disposed in an air supply passage connected to an exhaust passage of an engine, the electric air pump is first driven after the start of the engine, and the flow rate control valve is then opened after a lapse of a predetermined time. At a time after starting the driving of the electric air pump, the abnormality of the electric air pump is detected by comparing a deviation between the current before and after driving of the electric air pump with a predetermined reference value. After opening of the flow rate control valve, the abnormality of the flow rate control valve is detected by comparing the deviation between the current before and after the opening of the flow rate control valve with a predetermined reference value.

5 Claims, 7 Drawing Sheets

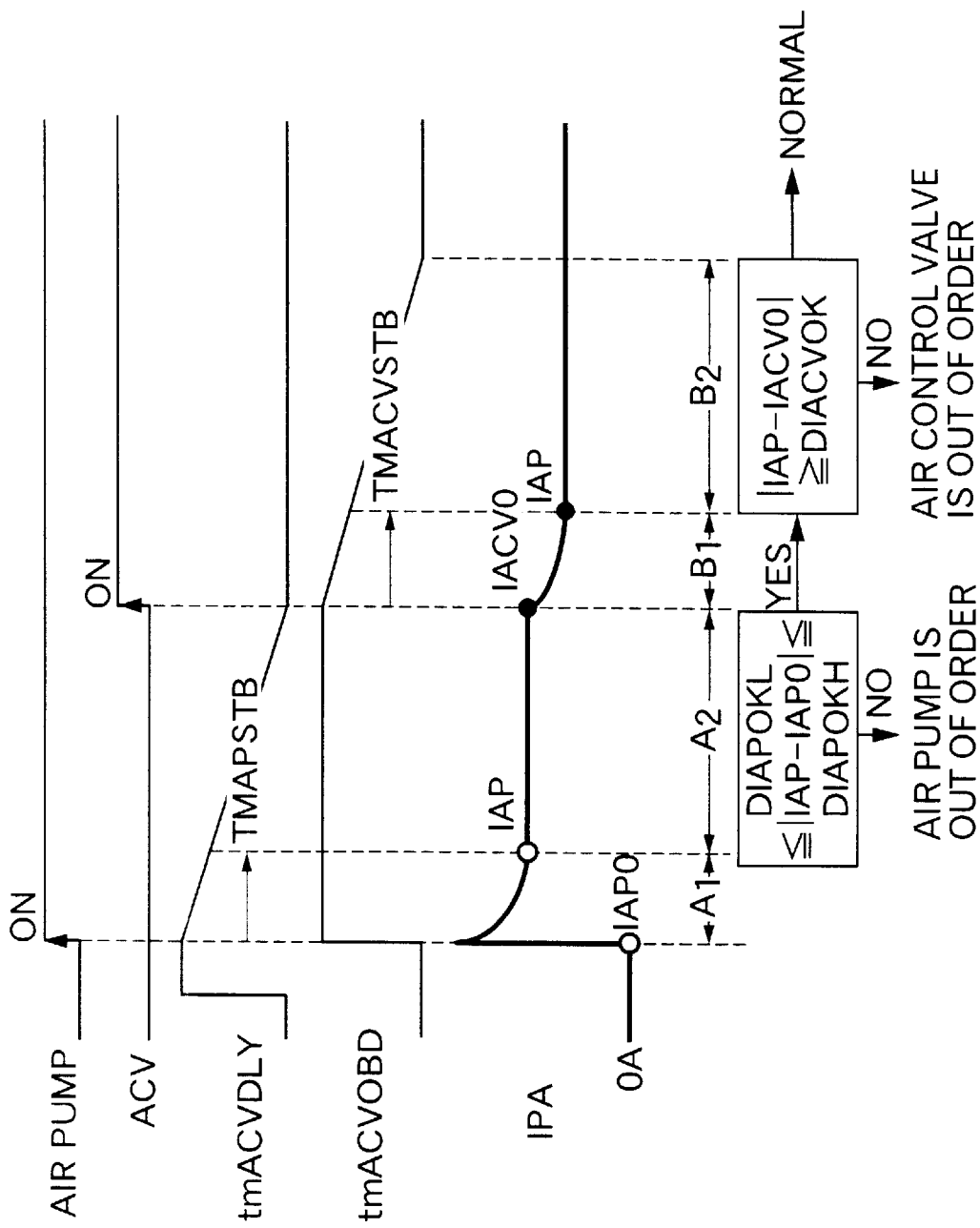

ABNORMALITY DETECTING DEVICE FOR EXHAUST SECONDARY AIR SUPPLYING SYSTEM

BACKGROUND OF THE INVENTION

1. Field of the Invention

The present invention relates to an exhaust secondary air supply system for supplying secondary air to an exhaust passage by using an electric air pump, to decrease harmful components in an exhaust gas from an engine, and more particularly, to an abnormality detecting device for detecting an abnormal state of the electric air pump, an air supply passage, or a flow rate control valve provided in the air supply passage.

2. Description of the Related Art

There is a known technique for detecting an abnormality in an exhaust secondary air supply system by use of an $O_2$ sensor provided in an exhaust passage. This technique utilizes the knowledge that if the exhaust secondary air supply system is normally functioning, the $O_2$ sensor is brought into an oxygen-excessive state by supplying secondary air to the exhaust passage, and a signal indicative of a lean state is outputted.

There is also an abnormality detecting device for an exhaust secondary air supply system, which is described in Japanese Patent Application Laid-Open No. 8-61051. This abnormality detecting device is designed to calculate an electric power value from the current and the voltage in an electric air pump, and detect an abnormal state of the electric air pump depending upon whether the power value is in a predetermined range.

In the former technique, the trouble detection cannot be carried out for a period of time until the $O_2$ sensor is activated after the start of an engine and for this reason, it is necessary to supply secondary air after the activation of the $O_2$ sensor which occurs after a lapse of a predetermined time from the start of the engine, in order to carry out the trouble detection. However, there is a problem in that the need for the secondary air supply is immediately after the start of the engine, and it is not preferred to carry out the supplying of the secondary air after that, from the viewpoint of the fact that harmful components in an exhaust gas should be decreased.

The latter device suffers from a problem that it is necessary to continuously monitor the power value during operation of the electric air pump and for this reason, the abnormality detection cannot be carried out for a short period of time.

SUMMARY OF THE INVENTION

Accordingly, it is an object of the present invention to immediately and reliably detect an abnormal state of the electric air pump, the flow rate control valve or the air supply passage after the start of the engine.

To achieve the above object, according to a first aspect and feature of the present invention, there is provided an abnormality detecting device for an exhaust secondary air supply system comprising an electric air pump, an air supply passage which connects the electric air pump to an exhaust passage of an engine, a flow rate control valve provided in the air supply passage, and an electric current detecting means for detecting the current flowing in the electric air pump. An abnormality detecting means detects an abnormal state of the electric air pump, the flow rate control valve or the air supply passage, based on the current detected by the current detecting means in a state in which a signal indicative of a command to close the flow rate control valve and a signal indicative of a command to drive the electric air pump are outputted.

With the above arrangement, the abnormal state of the electric air pump, the abnormal state of the flow rate control valve, or the abnormal state of the air supply passage between the electric air pump and the flow rate control valve, can be detected. For example, if the detected current value is higher than an upper limit normal value, it can be determined that the electric air pump has been locked non-rotatably. If the current value is zero, it can be determined that the current is not supplied to the electric air pump. If the current value is higher than zero and lower than a lower limit normal value, it can be determined that the air supply passage between the electric air pump and the flow rate control valve becomes blocked, or the flow rate control valve is out of order in opening.

According to a second aspect and feature of the present invention, there is provided an abnormality detecting device for an exhaust secondary air supply system, comprising an electric air pump, an air supply passage which connects the electric air pump to an exhaust passage of an engine, a flow rate control valve provided in the air supply passage, an electric current detecting means for detecting the current flowing in the electric air pump, and an abnormality detecting means for detecting an abnormal state based on the current detected by the current detecting means. The abnormality detecting means detects an abnormal state of the flow rate control valve or the air supply passage by comparing the current in a first state in which a signal indicative of a command to close the flow rate control valve and a signal indicative of a command to drive the electric air pump are outputted, with the current in a second state in which a signal indicative of a command to open the flow rate control valve is outputted, subsequent to the first state.

With the above arrangement, it is possible to detect an abnormal state of the flow rate control valve, or the abnormal state of the air supply passage between the electric air pump and the flow rate control valve. For example, if the current in the electric air pump is not decreased when the signal indicative of the command to open the flow rate control valve is outputted, it can be determined that the flow rate control valve has been secured in a closed state, or the air supply passage between the electric air pump and the flow rate control valve has been clogged. If the current in the electric air pump remains fixed when the signal indicative of the command to open the flow rate control valve is outputted, it can be determined that the flow rate control valve has been secured in an opened state, or the air supply passage between the electric air pump and the flow rate control valve has become blocked.

According to a third aspect and feature of the present invention, there is provided an abnormality detecting device for an exhaust secondary air supply system comprising an electric air pump, an air supply passage which connects the electric air pump to an exhaust passage of an engine, a flow rate control valve provided in the air supply passage, an electric current detecting means for detecting the current flowing in the electric air pump, and an abnormality detecting means for detecting an abnormal state based on the current detected by the current detecting means. The abnormality detecting means detects an abnormal state of the flow rate control valve or the air supply passage by comparing the current in a first state in which the flow rate control valve has been closed and a first stabilization-waiting time has lapsed after driving the electric air pump, with the current in a second state in which a second stabilization-waiting time has lapsed after opening of the flow rate control valve, subsequent to the first state.

With the above arrangement, it is possible to detect an abnormal state of the flow rate control valve, or an abnormal state of the air supply passage between the electric air pump and the flow rate control valve. For example, if the current in the electric air pump is not decreased when the signal indicative of the command to open the flow rate control valve is outputted, it can be determined that the flow rate control valve has been secured in a closed state, or the air supply passage between the electric air pump and the flow rate control valve has been clogged. If the current in the electric air pump remains fixed when the signal indicative of the command to open the flow rate control valve is outputted, it can be determined that the flow rate control valve has been secured in an opened state, or the air supply passage between the electric air pump and the flow rate control valve has become blocked. Moreover, the current is detected in the first state in which the first stabilization-waiting time has lapsed after driving of the electric air pump, and hence, an influence of a variation in current generated in a moment of driving of the electric air pump can be eliminated. In addition, the current is detected in the second state in which the second stabilization-waiting time has lapsed after opening of the flow rate control valve, and hence, the influence of a variation in current generated due to a decrease in load with the opening of the flow rate control valve, can be eliminated. Thus, it is possible to accurately detect the current in the electric air pump.

The above and other objects, features and advantages of the invention will become apparent from the following description of the preferred embodiment taken in conjunction with the accompanying drawings.

BRIEF DESCRIPTION OF THE DRAWINGS

FIGS. 1 to 7 show an embodiment of the present invention, wherein

FIG. 1 is an illustration of the entire arrangement of an exhaust secondary air supply system according to the embodiment of the present invention.

FIG. 2 is a flow chart for a software routine for a condition for allowing the supply of electric current to an air pump.

FIG. 3 is a flow chart for a software routine for the control of the supply of electric current to an air pump.

FIG. 4 is a flow chart for an abnormality detecting software routine.

FIG. 5 is a flow chart for a software routine for a condition for allowing the carrying-out of the detection of an abnormality.

FIG. 6 is a flow chart for an abnormality detection carrying-out software routine.

FIG. 7 is a time chart for explaining the operation.

DETAILED DESCRIPTION OF THE PREFERRED EMBODIMENT

The present invention will now be described by way of an embodiment with reference to the accompanying drawings.

Figure 1:
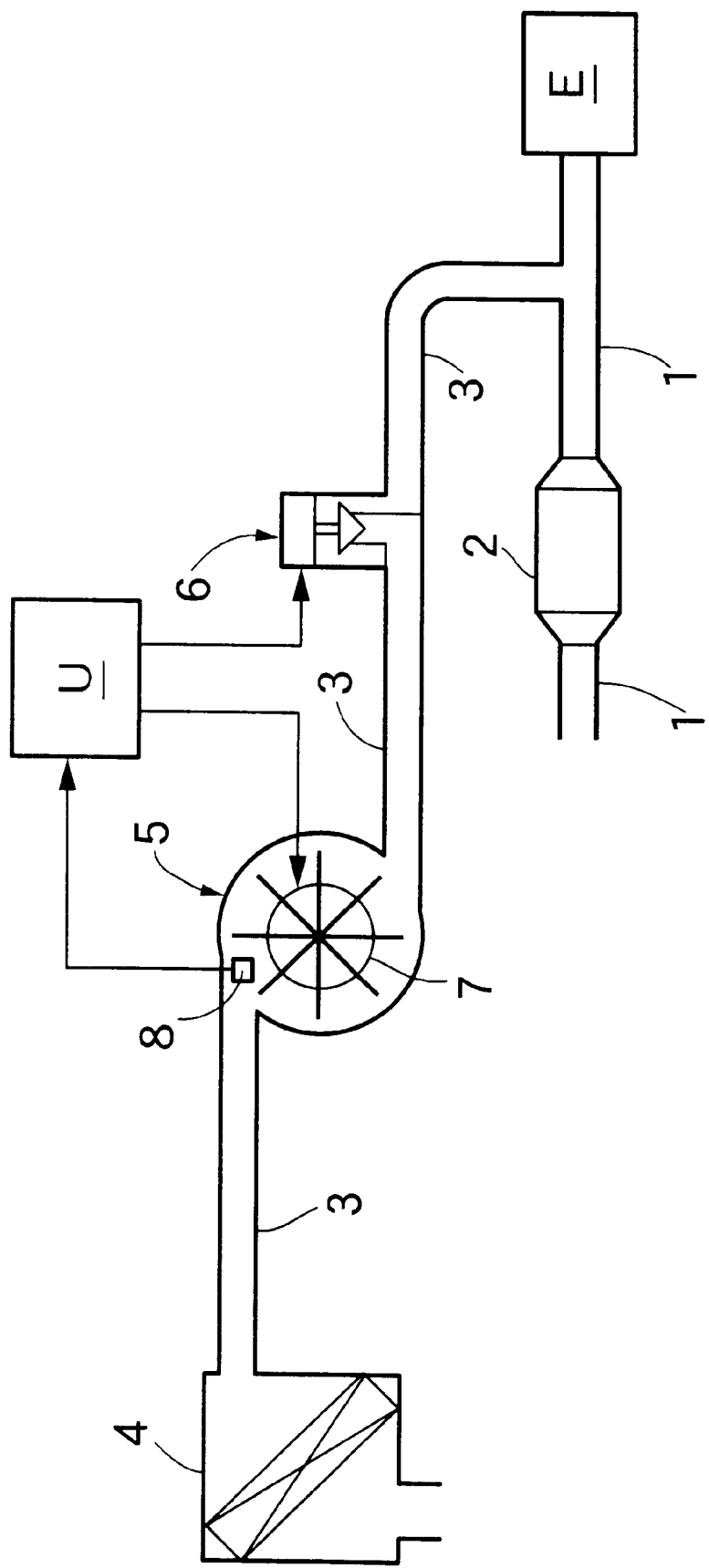

As shown in FIG. 1, an exhaust emission control catalyst 2 for purifying an exhaust gas, is provided in an exhaust passage 1 extending from an engine E, and an air supply passage 3 of an exhaust secondary air supplying system is connected at its downstream end to the exhaust passage 1 at a point upstream of the exhaust emission control catalyst 2.

An air cleaner 4, an electric air pump 5 and a flow rate control valve 6 are provided in the air supply passage 3, in sequence from the upstream side to the downstream side of the air supply passage 3. An electronic control unit U having the abnormality detecting means of the present invention controls (1) the turning-on/off of a motor 7 for driving the electric air pump 5, and (2) the turning-on/off of the flow rate control valve 6 comprising a solenoid valve, and also detects the abnormality of the electric air pump 5, the flow rate control valve 6 or the air supply passage 3 based on a signal from an electric current sensor 8 for detecting the current flowing in the motor 7.

The exhaust secondary air supplying system serves to provide the activation of the exhaust emission control catalyst 2 and to oxidize harmful components such as carbon monoxide and the like in an exhaust gas by driving the electric air pump 5 for only a predetermined of period of time after starting the engine E, to supply air to the exhaust passage 1. In this case, the flow rate control valve 6 is closed during non-driving of the electric air pump 5 to prevent the back flow of the exhaust gas to the air supply passage 3. In this embodiment, when the electric air pump 5 is driven after starting the engine E, the flow rate control valve 6 is opened with a predetermined lag of time, rather than being opened simultaneously with the driving of the electric air pump 5, whereby the abnormality of the electric air pump 5, the flow rate control valve 6 or the air supply passage 3 is detected. The operation for this purpose will be described with reference to flow charts in FIGS. 2 to 6 and a time chart in FIG. 7.

Figure 2:
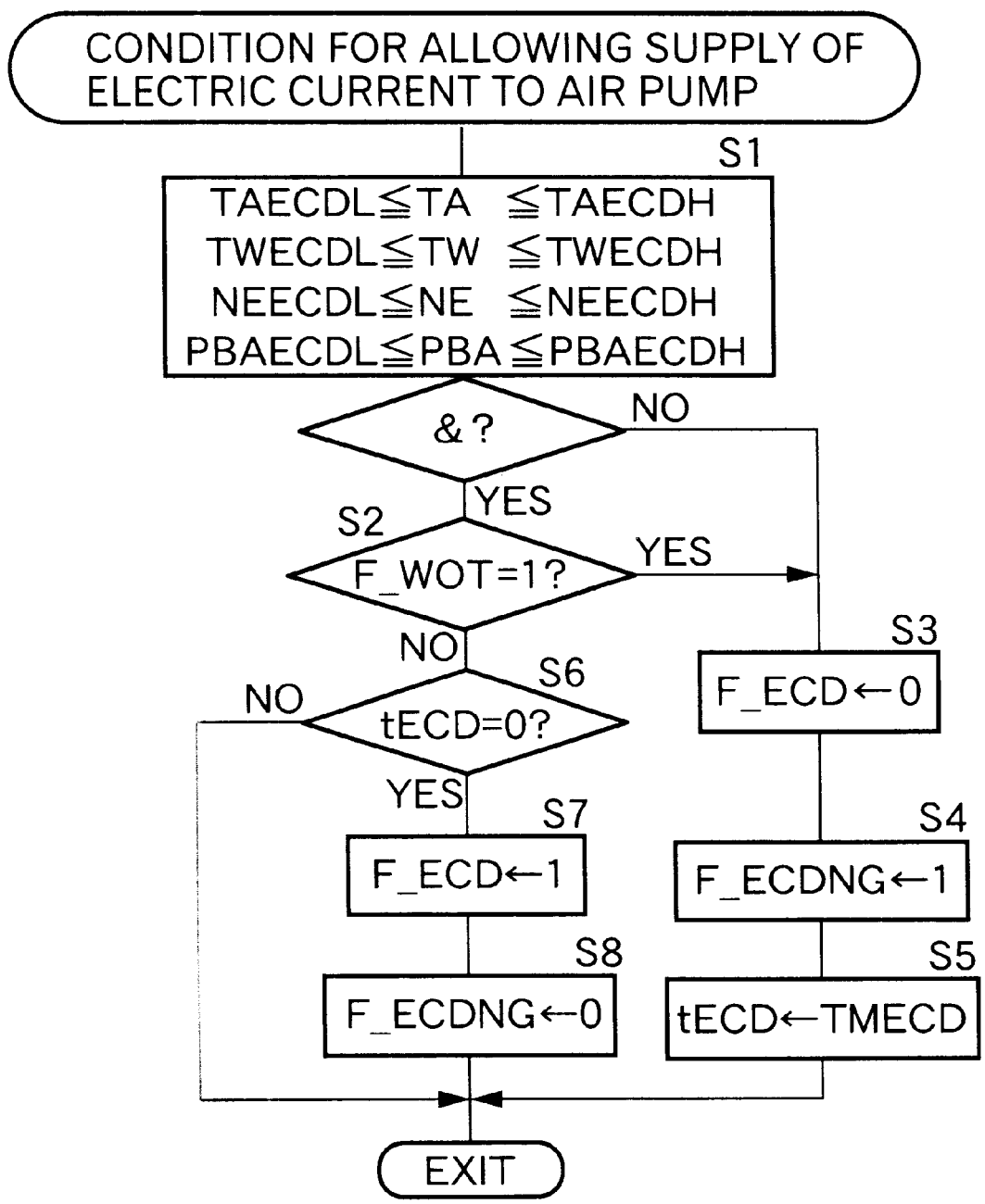

The flow chart in FIG. 2 is to determine conditions for allowing the supplying of electric current to the electric air pump 5. First, at Step S1, the operational state of the engine E is determined. More specifically, it is determined whether the atmospheric temperature TA is in a predetermined range (e.g., in a range of −10° C. to 80° C.); the temperature TW of cooling water is in a predetermined range (e.g., in a range of −10° C. to 100° C.); the engine revolution-speed NE is in a predetermined range (e.g., in a range of 600 to 6,000 RPM); and the intake negative pressure PBA is in a predetermined range (e.g., in a range of −600 to 0 mmHg). If at least one of the four conditions is not established, or if all of the four conditions are established, and if a work-out flag F_WOT is at "1" at Step S2 to indicate that the engine E is in a full-load operational state, a flag F_ECD for allowing the supply of current to the electric air pump is cleared to "0" at Step S3. Then, a flag F_ECDNG for not allowing the supply of current to the electric air pump (this flag may be called later "the electric air pump current-supply not allowing flag F_ECDNG") is set at "1" at Step S4 to prohibit the supply of current to the electric air pump 5, and a stabilization-waiting timer tECD is set at Step S5.

If all of the four conditions have been established at Step S1, and the work-out flag F_WOT has been cleared to "0" at Step S2 to indicate that the engine E is not in the full-load operational state, the processing is advanced to Step S6. If the counting time of the stabilization-waiting timer tECD has been up at Step S6, and it has been confirmed that the state in which the answer at Step S1 is YES and the state in which the answer at Step S2 is NO, is being continued for a predetermined time tECD (e.g., 3 seconds), the flag F_ECD for allowing the supply of current to the electric air pump is set at "1" at Step S7 to allow the supply of current to the electric air pump 5, and the flag F_ECDNG for not allowing the supply of current to the electric air pump is cleared to "0" at Step S8.

Figure 3:
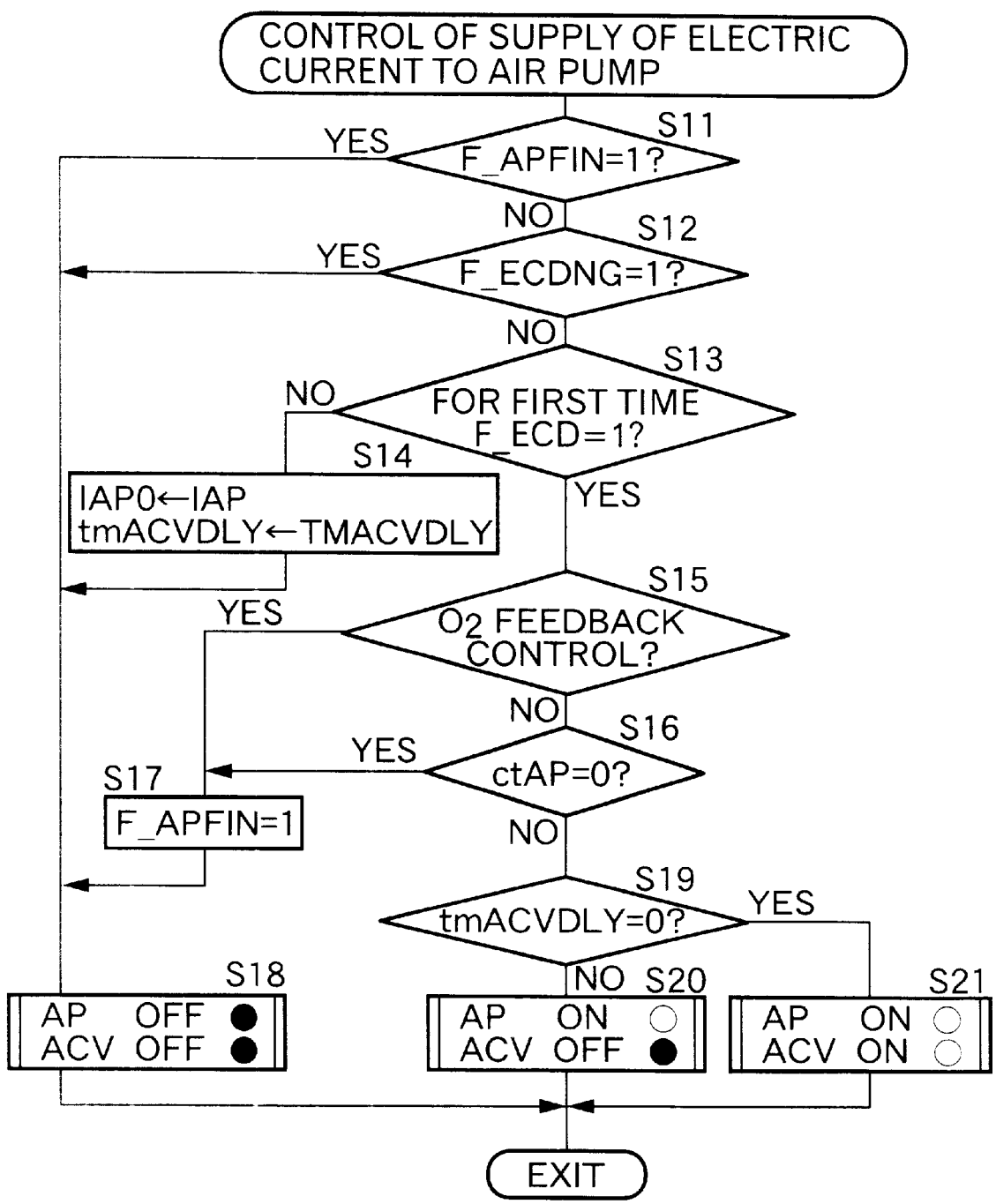

The flow chart in FIG. 3 is to control the supply of current to the electric air pump 5. First, at Step S11, it is determined whether a flag F_APFIN (which will be described hereinafter) for finishing the supply of current to the electric air pump (this flag may be called later "the electric air pump current-supply finishing flag F_APFIN") is equal to "1" to indicate that the supply of current to the electric air pump 5 has been finished, and at Step S12, it is determined whether the flag F_ECDNG for not allowing the supply of current to the electric air pump is equal to "1". If the flag F_APFIN is equal to "1" at Step 11 and the flag F_ECDNG is equal to "1", at Step S12, the electric air pump 5 is turned off (closed) and the flow rate control valve 6 is turned off (closed) at Step S18. On the other hand, if the flag F_APFIN for finishing the supply of current to the electric air pump has been cleared to "0" at Step S11, and the flag F_ECDNG for not allowing the supply of current to the electric air pump has been cleared to "0" at Step S12, the processing is advanced to Step S13. If the flag F_ECD for allowing the supply of current to the electric air pump is equal to "0" at Step S13, the value IAP (if normal, is near zero) of current flowing in the electric air pump 5 at that time is set at a first reference current value IAPO and a flow rate control valve opening delay timer tmACVDLY for retarding the opening of the flow rate control valve 6 relative to the driving of the electric air pump 5 (at a preset value tmACVDLY, e.g., 2 seconds) is set at Step S14, progressing to Step S18.

If the flag F_ECD for allowing the supply of current to the electric air pump has been set at "1" at Step S13, the processing is shifted to Step S15. If the $O_2$ feedback control of the air-fuel ratio is being carried out at Step S15, namely if the exhaust emission control catalyst 2 has already been activated to ensure that the supply of air is not required, the electric air pump current-supply finishing flag F_APFIN is set at "1" at Step S17, progressing to Step S18. Even if the $O_2$ feedback control of the air-fuel ratio is not being carried out at Step S15, if the counting time of an electric air pump current-supply finishing timer ctAP set at the start of the engine E is up at Step S16, namely, a predetermined time (e.g., 60 seconds) has lapsed from the start of the engine E, the electric air pump current-supply finishing flag F_APFIN is similarly set at "1" at Step S17, progressing to Step S18.

If the $O_2$ feedback control of the air-fuel ratio is not being carried out at Step S15, and the counting time of the electric air pump current-supply finishing timer ctAP is not up at Step S16, the processing is shifted to Step S19. If the counting time of the flow rate control valve opening delay timer tmACVDLY set at Step S14 is not up at Step S19, the electric air pump 5 is turned on (driven) and at the same time, the flow rate control valve 6 is turned off (closed) at Step S20. If the counting time of the flow rate control valve opening delay timer tmACVDLY is up at Step S19, the electric air pump 5 is turned on (driven) and at the same time, the flow rate control valve 6 is turned on (opened) at Step S21.

This will be described using the time chart in FIG. 7. The flow rate control valve opening delay timer tmACVDLY is set after the start of the engine E. During the counting operation of the flow rate control valve opening delay timer tmACVDLY, the flow rate control valve 6 is maintained in its OFF (closed) state. When the counting time of the flow rate control valve opening delay timer tmACVDLY is up, the flow rate control valve 6 is turned on (opened).

Figure 4:
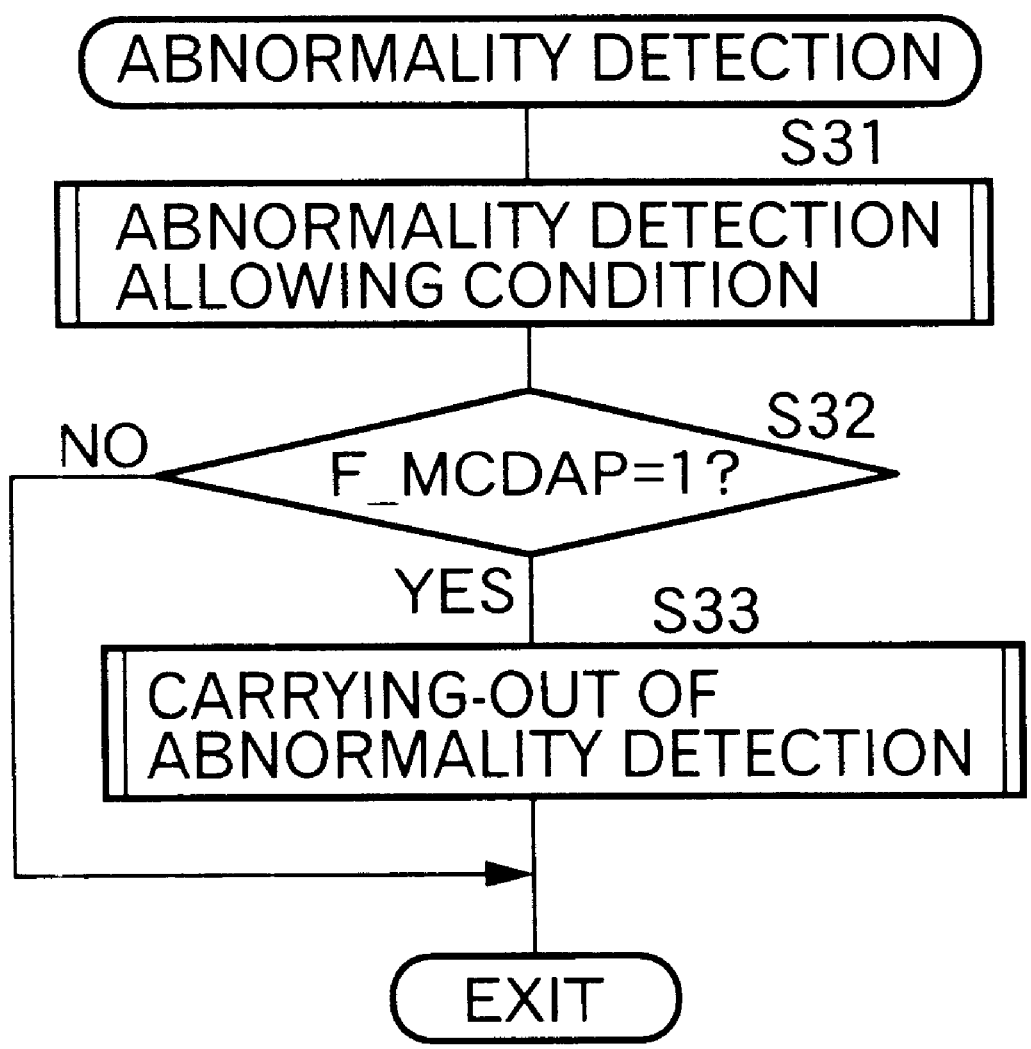

The flow chart in FIG. 4 is to detect the abnormality of the electric air pump 5 and the flow rate control valve 6. First, the establishment of the abnormality detection allowing condition is determined at Step S31. The contents of this determination will be described hereinafter with reference to the flow chart in FIG. 5. If an abnormality detection allowing flag F_MCDAP which will be described hereinafter, is set at "1" at subsequent Step S32, the detection of the abnormality of the electric air pump 5 and the flow rate control valve 6 is carried out at Step S33. The contents of this detection will be described hereinafter with reference to the flow chart in FIG. 6.

Figure 5:
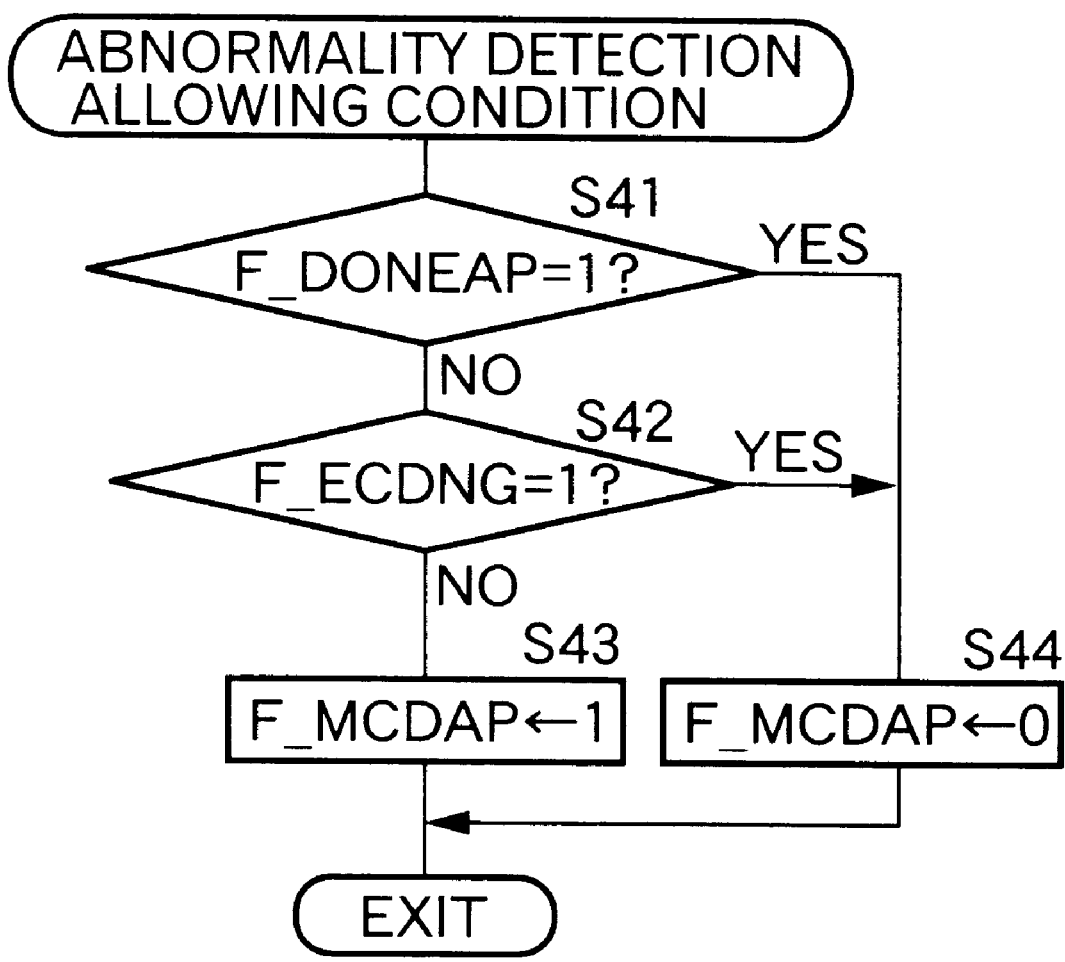

The flow chart in FIG. 5 is a subroutine for Step S31 (the abnormality detection allowing condition) of the flow chart in FIG. 4. First, if an abnormality detection completion flag F_DONEAP which will be described hereinafter, has been cleared to "0" at Step S41 to indicate that the abnormality detection is not finished, and the electric air pump current-supply not allowing flag F_ECDNG has been cleared to "0" at Step S42, the abnormality detection allowing flag F_MCDAP is set at "1" at Step S43 to allow the carrying-out of the abnormality detection. If the electric air pump current-supply not allowing flag F_ECDNG has been set at "1" at Step S42, the abnormality detection allowing flag F_MCDAP is cleared to "0" at Step S44 to prohibit the carrying-out of the abnormality detection. If the abnormality detection completion flag F_DONEAP has been set at "1" at Step S41, the abnormality detection allowing flag F_MCDAP is cleared to "0" at Step S44 to prohibit the carrying-out of the abnormality detection.

Figure 6:
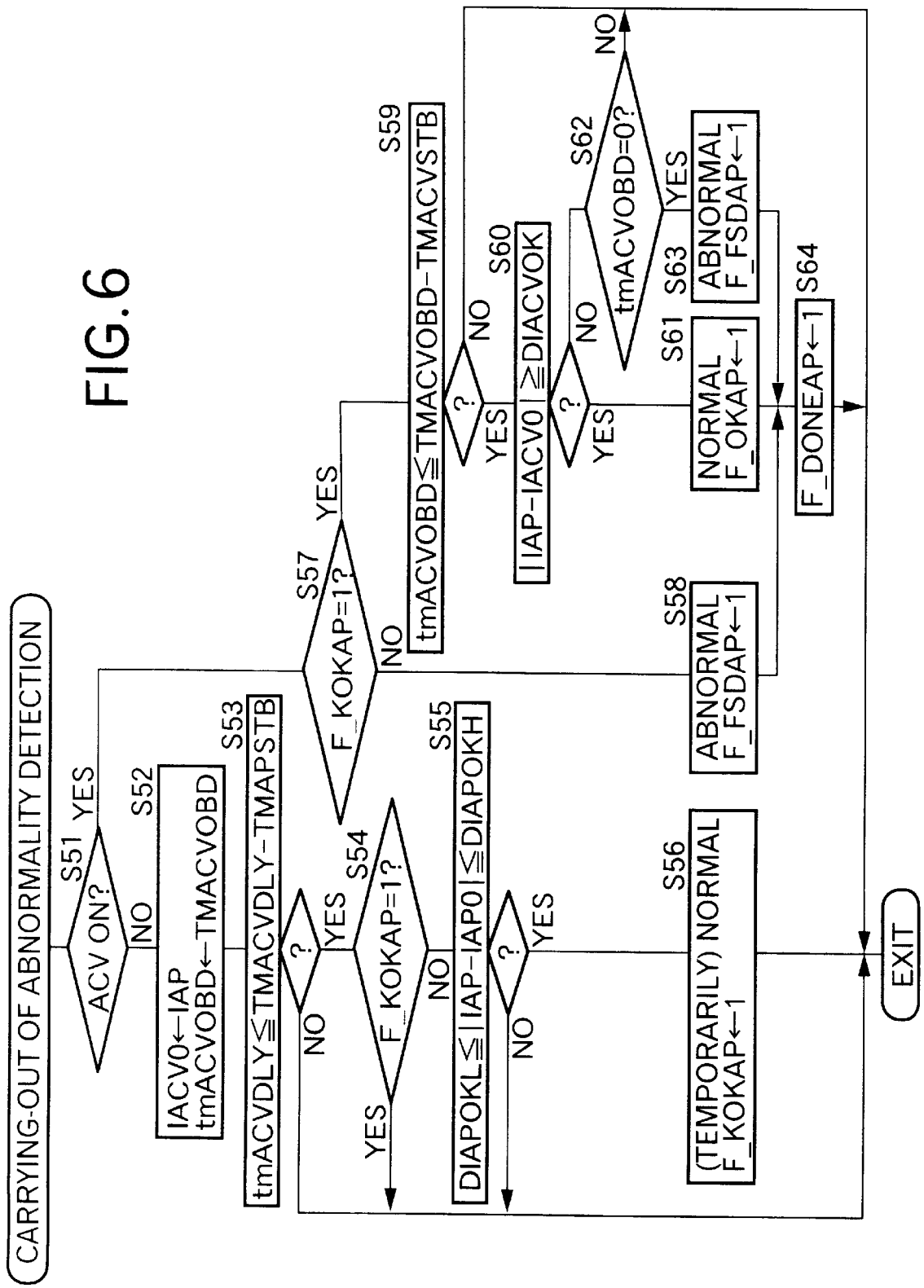

The flow chart in FIG. 6 is a subroutine for Step S33 (the carrying-out of the abnormality detection) of the flow chart in FIG. 4. First, if the flow rate control valve 6 has been turned off (closed) at Step S51, the value IAP of current flowing in the electric air pump 5 at that time is set at a second reference current value IACVO (e.g., 10 amp.) when the electric air pump is in a turned-on state and the flow rate control valve is in a turned-off state, and at the same time, a timer tmACVOBD (e.g., 5 seconds) for setting the maximum time of carrying-out of the abnormality detection is set, at Step S52. If the period of time until the counting time of the flow rate control valve opening delay timer tmACVDLY is up after the lapse of a first stabilization-waiting time TMPASTB (e.g., 2 seconds) after the start of counting of the flow rate control valve opening delay timer tmACVDLY, is in an area $A_2$ in the time chart in FIG. 7 at subsequent Step S53, the processing is advanced to Step S54. The first stabilization-waiting time TMAPSTB is a time required for the stabilization of the current value IAP which rises when the electric air pump 5 is driven. The area $A_2$ corresponds to a first state according to the embodiment of the present invention.

If a temporarily normal determining flag F_KOKAP which will be described hereinafter has been cleared to "0" at subsequent Step S54, it is determined at Step S55 whether the absolute value of the deviation between the current value IAP detected by the current sensor 8 and the first reference current value IAPO at the stoppage of the electric air pump 5 is between a lower limit value DIAPOKL (e.g., 3 amp.) and an upper limit value DIAPOKH (e.g., 15 amp.). If the absolute value of the deviation is between the lower limit value DIAPOKL and the upper limit value DIAPOKH as a result of the determination, it is determined at Step S56 that the electric air pump 5 is normal temporarily, and the temporarily normal determining flag F_KOKAP is set at "1".

This will be described with reference to the time chart in FIG. 7. If the absolute value of the deviation between the current value IAP detected by the current sensor 8 and the first reference current value IAPO at the stoppage of the electric air pump 5 is in a predetermined range when the first stabilization-waiting time TMAPSTB has lapsed after turning-on (driving) of the electric air pump 5 to enter the area $A_2$, it can be determined that the electric air pump 5 is being normally operated. If the absolute value of the deviation is abnormally small, there is a possibility that the supply of current to the electric air pump 5 may not be carried out, there is a possibility that the flow rate control valve 6 may be out of order in an opened state, or there is a possibility that the air supply passage 3 between the electric air pump 5 and the flow rate control valve 6 may be broken. If the absolute value of the deviation is abnormally large, there is a possibility that the electric air pump 5 may be in an over-load state such as a locked state, and thus, a large current may flow in the electric air pump 5.

Returning to the flow chart in FIG. 6, if the temporarily normal determining flag F_KOKAP is not set at "1" at Step S57 when the flow rate control valve 6 has been turned on (opened) at Step S51, the absolute value of the deviation has never fallen into the predetermined range in the area $A_2$ in FIG. 7. Thus, it is determined at Step S58 that there is an abnormality, whereby the abnormality determining flag F_FSDAP is set at "1", and the abnormality detection completion flag F_DONEAP is set at "1" at Step S64 to finish the abnormality detection.

On the other hand, if the temporarily normal determining flag F_KOKAP has been set at "1" at Step S57, the detection of the abnormality of the flow rate control valve 6 and the air supply passage 3 is carried out at subsequent Steps S59 to S63.

First, if the time until the counting time of the abnormality detection maximum time setting timer tmACVOBD is up after a lapse of a second stabilization-waiting time TMACVSTB (e.g., 2 seconds) after the start of the counting of the abnormality detection maximum time setting timer tmACVOBD, is in an area $B_2$ in the time chart in FIG. 7 at Step S59, the processing is advanced to Step S60. The second stabilization-waiting time TMACVSTB is the time required for the stabilization of the current value IAP in the electric air pump 5 which has dropped due to a decrease in load with the turning-on (opening) of the flow rate control valve 6. At subsequent Step S60, the absolute value of the deviation between the current value IAP detected by the current sensor 8 and the second reference current value IACVO before the opening of the flow rate control valve 6 is compared with a threshold value DIACVOK (e.g., 1 amp.). If the absolute value of the deviation is equal to or larger than the threshold value DIACVOK as a result of the comparison, it is determined that the flow rate control valve 6 and the air supply passage 3 are normal, whereby the normality determining flag F_OKAP is set at "1" at Step S61, and then, the abnormality detection completion flag F_DONEAP is set at "1" at Step S64 to finish the abnormality detection. It should be noted that the area $B_2$ corresponds to a second state according to the embodiment of the present invention.

On the other hand, when the absolute value of the deviation is smaller than the threshold value DIACVOK at Step S60 and the counting time of the abnormality detection maximum time setting timer tmACVOBD is up at Step S62, it is determined that the flow rate control valve 6 or the air supply passage 3 is abnormal, whereby the abnormality determining flag F_FSDAP is set at "1" at Step S63, and then, the abnormality detection completion flag F_DONEAP is set at "1" at Step S64 to finish the abnormality detection.

This will be described with reference to the time chart in FIG. 7. When the second stabilization-waiting time TMACVSTB has lapsed after turning-on (opening) of the flow rate control valve 6 to enter the area $B_2$, the load of the electric air pump 5 is decreased, if the flow rate control valve 6 is switched over from the closed state to the opened state, and there is no clogging and no damage in the air supply passage 3. Therefore, the absolute value of the deviation must be equal to or larger than the threshold value DIACVOK. However, if the flow rate control valve 6 cannot be opened due to any trouble, or if the air supply passage 3 upstream of the flow rate control valve 6 is clogged even if the flow rate control valve 6 can be opened, then the load of the electric air pump 5 is not varied. Therefore, the absolute value of the deviation becomes smaller than the threshold value DIACVOK, whereby the abnormality can be detected. If the flow rate control valve 6 is out of order in opening from the beginning, or if a portion of the air supply passage 3 between the electric air pump 5 and the flow rate control valve 6 is blocked, then the load of the electric air pump 5 is not varied, even if a signal indicative of a command to open the flow rate control valve 6 is outputted. Therefore, the absolute value of the deviation becomes smaller than the threshold value DIACVOK, whereby the abnormality can be detected.

Although the embodiment of the present invention has been described in detail, it will be understood that the present invention is not limited to the above-described embodiment, and various modifications in design may be made without departing from the spirit and scope of the invention defined in claims.

What is claimed is:

1. An abnormality detecting device for an exhaust secondary air supply system for an engine, comprising:

a control unit including an abnormality detecting means;

an electric air pump coupled to said control unit;

an air supply passage connecting said electric air pump to an exhaust passage of the engine;

a flow rate control valve provided in said air supply passage and coupled to said control unit; and an electric current detecting means for detecting a current flowing in said electric air pump, wherein said abnormality detecting means detects an abnormal state of said electric air pump, said flow rate control valve or said air supply passage, based on the current detected by said current detecting means when said control unit outputs a command signal to close said flow rate control valve and a command signal to drive said electric air pump.

2. An abnormality detecting device for an exhaust secondary air supply system for an engine, comprising:

a control unit including an abnormality detecting means;

an electric air pump coupled to said control unit;

an air supply passage connecting said electric air pump to an exhaust passage of the engine;

a flow rate control valve provided in said air supply passage and coupled to said control unit; and an electric current detecting means for detecting a current flowing in the electric air pump, wherein said abnormality detecting means detects an abnormal state of said flow rate control valve or said air supply passage by comparing a) the current detected by said current detecting means in a first state in which a command signal is output from said control unit to close said flow rate control valve and a command signal is output from said control unit to drive the electric air pump, with b) the current in a second state subsequent to the first state, in which a command signal is output from said control unit to open said flow rate control valve.

3. An abnormality detecting device for an exhaust secondary air supply system according to claim 2, wherein said first state is a state wherein a predetermined stabilization-waiting time has lapsed after starting the driving of said electric air pump.

4. An abnormality detecting device for an exhaust secondary air supply system according to claim 2, wherein said second state is a state wherein a predetermined stabilization-waiting time has lapsed after opening of the flow rate control valve.

5. An abnormality detecting device for an exhaust secondary air supply system for an engine, comprising:

a control unit including an abnormality detecting means;

an electric air pump coupled to said control unit;

an air supply passage connecting said electric air pump to an exhaust passage of the engine;

a flow rate control valve provided in said air supply passage and coupled to said control unit; and an electric current detecting means for detecting a current flowing in said electric air pump, wherein said abnormality detecting means detects an abnormal state of said flow rate control valve or said air supply passage by comparing a) the current detected by said current detecting means in a first state in which said flow rate control valve has been closed and a first stabilization-waiting time has lapsed after starting the driving of said electric air pump, with b) the current in a second state, subsequent to the first state, in which a second stabilization-waiting time has lapsed after opening of said flow rate control valve.

* * * * *